United States Patent [19]
Funabashi et al.

[11] 3,835,186
[45] Sept. 10, 1974

[54] PROCESS FOR PREPARATION OF AROMATIC CARBOXYLIC ACID CHLORIDE

[75] Inventors: Kazutoshi Funabashi; Kanji Harada, both of Tokyo, Japan

[73] Assignee: Teigjin Limited, Osaka, Japan

[22] Filed: Mar. 6, 1973

[21] Appl. No.: 338,422

[52] U.S. Cl. ............................................ 260/544 M
[51] Int. Cl. .............................................. C07c 63/14
[58] Field of Search ................................ 260/544 M

[56] References Cited
UNITED STATES PATENTS
2,865,959  12/1958  Toland ........................... 260/544 M Primary Examiner—Lorraine A. Weinberger
Assistant Examiner—Richard D. Kelly
Attorney, Agent, or Firm—Sherman & Shalloway

[57] ABSTRACT

A process for the preparation of aromatic acid chlorides characterized by reacting a polyester comprising an aromatic dibasic acid as the main acid component with at least one kind of trichloromethylbenzene selected from the group consisting of benzene having at least one trichloromethyl radical and benzene having at least one trichloromethyl radical and at least one nucleus-substituted chlorine atom in the presence of at least one catalyst selected from the group consisting of iron, aluminum, their oxides, their sulphides and their salts to produce an acid chloride of said aromatic dibasic acid and an aromatic acid chloride formed by conversion of all the trichloromethyl radicals in said trichloromethylbenzene to chlorocarbonyl radicals.

9 Claims, No Drawings

PROCESS FOR PREPARATION OF AROMATIC CARBOXYLIC ACID CHLORIDE

This invention relates to a process for the preparation of aromatic carboxylic acid chlorides. More particularly, it relates to a process for the preparation of aromatic carboxylic acid chlorides characterized by reacting a polyester comprising an aromatic dicarboxylic acid as the main acid component with at least one kind of trichloromethylbenzene selected from the group consisting of benzene having at least one trichloromethyl radical and benzene having at least one trichloromethyl radical and at least one nucleus-substituted chlorine atom to produce an acid chloride of said aromatic dicarboxylic acid and an aromatic carboxylic acid chloride formed by conversion of all the trichloromethyl radicals of said trichloromethylbenzene into chlorocarbonyl radicals.

Aromatic carboxylic acid chlorides are useful compounds as raw materials in organic chemical industry, high polymer industry, etc. For example, benzoyl chloride is a very useful reagent for introducing a benzoyl radical, etc. in the field of fine chemicals such as dyestuffs, medicines and perfumes. Aromatic dibasic acid chlorides are useful compounds as raw materials of aromatic polyesters, polyamides, polyoxadiazoles, etc., leading to heat-resistant resin varnishes and fibers. Tri(chlorocarbonyl)-benzene is made use of as a raw material of heat-resistant resins.

As conventional processes for the preparation of aromatic carboxylic acid chlorides, a process of reacting an aromatic carboxylic acid with a chlorinating agent such as phosphorus pentachloride, phosphorus trichloride, phosgene, thionyl chloride or trichloromethyl-substituted benzene, and a process of reacting an aromatic carboxylic acid methyl ester with trichloromethyl-substituted benzene (see German Laid-open Application No. 1,954,793) has been known.

Said known processes for the preparation of aromatic carboxylic acid chlorides use monomeric aromatic carboxylic acids or esters thereof as starting materials; whereas, the present invention uses polyesters of aromatic dicarboxylic acid as starting materials. Since the polyesters differs remarkably from the monomeric acid or ester in physical and chemical properties, said known processes for the preparation of aromatic carboxylic acid chlorides are not readily applicable to the case of the present invention. For example, in the reaction between an aromatic carboxylic acid methyl ester and trichloromethylbenzene disclosed in said German laid-open application, it is disclosed that paratoluenesulphonic acid, $ClSO_3H$, $POCl_3$, $SnCl_4$, Sb-chlorides, $TiCl_4$, $BF_3$, $CrCl_3$, $MnCl_2$, $PbCl_2$, $BiCl_3$, $CuCl_2$, $SnCl_2$ and $CoCl_3$ can be used effectively as catalysts, but these compounds exhibit little, if any, catalytic action in the reaction of the present invention.

As examples of aromatic dibasic acid forming part of the polyester of the present invention, terephthalic acid, isophthalic acid, phthalic acid, diphenyldicarboxylic acid, 2,6-naphthalene dicarboxylic acid and 2,7-naphthalene-dicarboxylic acid may be mentioned.

As for the glycol reacting with such aromatic dibasic acids to form said polyester, any glycol will do. For example, ethylene glycol, propylene glycol, tetramethylene glycol and cyclohexane dimethanol may be used.

The polyester used in the process of the present invention is a homopolyester or copolyester composed of said aromatic dibasic acid and glycol and having an inherent viscosity higher than 0.2 (when measured in orthochlorophenol at 30°C.). For example, polyethylene terephthalate, polyethylene isophthalate, polyethylene phthalates, poly(ethylene terephthalate-ethylene isophthalate)copolymer, polypropylene terephthalate, polytetramethylene isophthalate, polypropylene diphenyldicarboxylate, poly-1,4-cyclohexane-dicarbinol terephthalate, polyethylene-2,6-naphthalene dicarboxylate and polypropylene-2,7-naphthalene dicarboxylate may be mentioned.

The use of a polyester comprising an aliphatic dibasic acid as a main acid component is not proper, for the object of the present invention can not be achieved, but it is permissible to use a polyester comprising an aliphatic dibasic acid as a minor part of the acid component thereof for the purpose of increasing the solubility of the polyester or lowering its melting point to facilitate its reaction with trichloromethyl-substituted benzene.

As for the glycol component, one having at least one hydrogen atom at the carbon in α-position to the hydroxyl radical is used preferably, and in case a polyester made from such glycol is used as raw material, an acid chloride can be produced with especially high yield.

Of such polyesters, polyethylene terephthalate, etc. are very easily obtainable, for they are mass-produced industrially, and therefore the amount of waste polyester formed is very large. The present invention is industrially advantageous from the viewpoint that such waste polyester can be utilized effectively, too. In case waste polyester is used, it is preferable to remove beforehand such contaminants as textile oil and releasing agent by treatment with a surface active agent or an organic solvent.

The trichloromethylbenzene which is the other reactant used in the reaction of the present invention is a benzene having at least one trichloromethyl radical or a benzene having at least one trichloromethyl radical and at least one nucleus-substituted chlorine atom. For example, benzotrichloride, 1,3-di(trichloromethyl)-benzene, 1,4-di(trichloromethyl)benzene, 1,3,5-tri(trichloromethyl)-benzene, 1,3-di(trichloromethyl)-5-chlorobenzene and 1-chloro-4-trichloromethylbenzene may be mentioned. Of the trichloromethylbenzenes, di(trichloromethyl) derivatives give better yield as compared with mono(trichloromethyl) derivatives, and are most preferable for use.

The process of the present invention is carried out by reacting said polyester with said benzene derivative having trichloromethyl substituents by heating them in the presence of one of the below-mentioned specific catalysts.

Speaking of the reaction stoichiometrically, one mol of an ester radical reacts with one mol of a trichloromethyl radical to form two mols of a chlorocarbonyl radical. For example, the reaction between polyethylene terephthalate and 1,3-di(trichloromethyl)benzene is shown by the following equation.

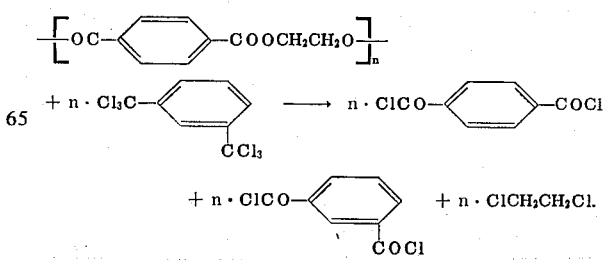

As shown by the equation, terephthaloyl chloride derived from polyethylene terephthalate isophthaloyl chloride derived from 1,3-di(trichloromethyl)benzene are formed, and 1,2-dichloroethane is obtained as by-product.

In practice, however, the molar ratio of the trichloromethyl radicals of benzene to the ester radicals of polyester need not be strictly 1:1, but this molar ratio should preferably be 0.91 – 1.2, especially 1.0 – 1.1. The yield of the reaction products decreases remarkably outside this molar ratio range.

As may be understood from the above reaction formula, in case the trichloromethylbenzene used is a trichloromethylbenzene having the structure to be arrived at by substituting a trichloromethyl radical for each of the two carboxyl radicals of an aromatic dicarboxylic acid forming part of the starting material polyester, there is an advantage that the product aromatic dicarboxylic acid chloride derived from said polyester and that derived from said trichloromethylbenzene are the same compounds.

The reaction of the present invention explained above does not progress in the absence of catalyst, but can be carried out effectively only in the presence of at least one of the below-mentioned specific catalysts. The catalysts used in the present invention are iron, aluminum, their oxides, their sulphides and their salts. Of these, iron and its oxides exhibit especially superior catalytic activity, and give a remarkably higher reaction rate as compared with iron salts and sulphides such as iron chloride. Aluminum, its oxides and its salts show lower catalytic activity as compared with iron and its compounds.

For example, in case 0.200 mol of polyethylene terephthalate is reacted with 0.210 mol of 1,4-di(trichloromethyl)benzene in the presence of 1 percent by weight each of ferric oxide and ferric chloride at a temperature of 180° – 185°C., a time-conversion relationship as shown in the following Table 1 is obtained by tracing the amount of 1,2-dichloroethane formed. The present inventors have confirmed that the formed amount of 1,2-dichloroethane is proportional to that of acid chloride.

Table 1

| Time for reaction (hr) | Yield of 1,2-dichloroethane in case ferric oxide is used as catalyst (g) | Yield of 1,2-dichloroethane in case ferric chloride is used as catalyst (g) |
|---|---|---|
| 0.5 | 4.02 | 1.76 |
| 1.0 | 9.55 | 4.52 |
| 1.5 | 14.57 | 8.41 |
| 2.0 | 16.08 | 12.05 |
| 2.5 | 16.83 | 14.44 |
| 3.0 | 17.05 | 15.57 |
| Theoretical yield | 19.8 | |

As examples of iron oxides, FeO, $Fe_2O_3$ and $Fe_3O_4$ may be mentioned. In case an iron oxide is used as catalyst, the distillation residue, for example, left after acid chloride is obtained can be recovered as iron oxide by merely burning it in air, and the oxide can be used anew as reaction catalyst. This is an industrial advantage.

As examples of iron salts, inorganic salts such as ferrous and ferric chlorides, sulphates, sulphides and organic acid salts such as acetates, oxalates and sulphonates may be mentioned. Of these salts, chlorides are most preferable for use. Also, aluminum oxide, including hydrate, and inorganic salts and organic acid salts as mentioned above of aluminum may be used. Said catalysts used in the present invention have merit that since they are generally stable in air, their handling is easy and they can be regenerated and re-used.

It is preferable that the amount of catalyst used should be within a range of 0.01 – 10 percent by weight based on the raw material polyester. If this amount is too small, the rate of reaction is low; whereas, if the amount is too large, the rate of reaction is raised but undesirable side reactions are induced and the yield of the reaction products lowers.

The reaction temperature used is 100° – 300°C., preferably 120° – 220°C. If the temperature is lower than 100°C., the reaction does not progress substantially. If it is higher than 300°C., the raw material trichloromethylbenzene is decomposed.

The time for reaction depends upon the reaction conditions, but generally speaking, about 1 – 30 hours is preferable.

According to the present invention, the objective aromatic carboxylic acid chloride can be produced with good yield, its separation from the reaction mixture can be effected easily by the conventional separating operation such as distillation or re-crystallization, and the aromatic carboxylic acid chloride can be obtained with a purity as high as about 99 percent. At the same time, the by-product dichloride formed by substitution of chlorine atoms for the two hydroxyl radicals of the glycol component of the polyester can be recovered almost quantitatively.

The process of the present invention also has an industrially very remarkable merit that a useful aromatic dibasic acid chloride having superior reactivity and wide applications can be prepared easily and at low cost from waste polyester which is formed in large amounts industrially.

The process of the present invention will be explained in more detail below by means of Examples.

Example 1

A 300 ml flask equipped with a distillation set was charged with 38.40 g (0.20 mol) of polyethylene terephthalate, 65.70 g (0.21 mol) of 1,4-di(trichloromethyl)-benzene and 1.05 g of ferric oxide, and then they were let undergo reaction at a reaction temperature of 180° – 185°C. for 4 hours with stirring. As shown in the above Table 1, 1,2-dichloroethane was formed with the passage of time, and after 4 hours, 1,2-dichloroethane was obtained by distillation with a yield of about 90 percent based on the theoretical amount (19.8 g). The remaining, about 10 percent of dichloroethane was being refluxed through the flask. (This was obtained as initial fraction in the succeeding step for distillation of acid chloride.)

After the end of the reaction, the reaction product was subjected to distillation under reduced pressure of 25 mmHg at a temperature of 180° – 185°C., and thus 69 g (about 85 percent of the theoretical yield) of terephthaloyl chloride was obtained.

The identification of the product was conducted as follows:

a. A portion of the product was taken out, and esterified with pyridine - methanol. The resultant ester was identified by means of gas chromatography.

The conditions for measurement were as follows:

Filler: polyethylene glycol succinate. Impregnation ratio: 10%. Carrier: Diasolid. Column length: 1 m. Helium flow rate: 23 ml/mm. Bath temperature: 175°C. Retention time: terephthalic acid dimethyl ester, 14 minutes 15 seconds.

b. 20 ml, per 3 g of the product, of 10 % aqueous caustic soda solution was added to the product, and the mixture was heated at 80°C. for 1 hour.

The reaction mixture was made acidic by addition of hydrochloric acid, and filtered. The resultant solids were sufficiently rinsed with water, and then rinsed with acetone to remove its acetone-soluble portion completely. The product was subjected to quantitative analysis. This was confirmed to be a free acid by infrared absorption spectrum.

Examples 2 - 14

The reaction apparatus used in Example 1 was used, and the reactants, catalyst and the reaction temperature were varied as shown in the following Table 2. The yield of the resultant acid chloride, too, is shown in Table 2. The identification of the resultant acid chloride was performed by the same method as shown in Example 1.

Example 15

Polyethylene terephthalate and 1,4-di(trichloromethyl)benzene were used in the ratios indicated in Table 3, and they were reacted together at 180° – 185°C. for 7 hours in the same manner as in Example 1.

It is found from Table 3 that terephthaloyl chloride can be obtained with especially high yield when the molar ratio of the ester radicals of polyethylene terephthalate to the trichloromethyl radicals of 1,4-di(trichloromethyl)benzene is within a range of 1.0 – 1.1.

Table 2

| Example No. | Raw materials — Polyester | Trichloromethylbenzene | Catalyst | Reaction temp. and time | Yield of Product |
|---|---|---|---|---|---|
| 2 | Polyethylene terephthalate 6.4 g(0.0333 mol) | 1,4-Di(trichloromethyl)benzene 10.4 g(0.0333 mol) | FeCl$_3$ 0.03 g | 170°C. 4 hrs. | Terephthaloyl chloride 12.2 g(90.2 %) |
| 3 | Polyethylene (terephthalate-isophthalate) copolymer (TA/IA=1/1) 6.4 g(0.0333 mol) | 1,3-Di(trichloromethyl)benzene 10.4 g(0.0333 mol) | FeCl$_3$ 0.03 g | 160°C 2 hrs. | Terephthaloyl chloride 3.1 g(92.0 %) Isophthaloyl chloride 8.1 g(80.0 %) |
| 4 | Polyethylene terephthalate 6.4 g(0.0333 mol) | 1,4-Di(trichloromethyl)benzene 10.4 g(0.0333 mol) | Fe powder 0.05 g | 180°C. 4 hrs. | Terephthaloyl chloride 10.9 g(80.6 %) |
| 5 | Polyethylene terephthalate 1.92 g(0.01 mol) | 1,4-Di(trichloromethyl)benzene 3.3 g(0.01 mol) | FeS 0.02 g | 180–185°C. 7 hrs. | Terephthaloyl chloride 1.6 g(79.0 %) |
| 6 | Polyethylene terephthalate 1.92 g(0.01 mol) | 1,4-Di(trichloromethyl)benzene 3.3 g(0.01 mol) | Fe$_2$O$_3$ 0.02 g | 170–175°C. 7 hrs. | Terephthaloyl chloride 1.7 g(84.0 %) |
| 7 | Polyethylene isophthalate 6.4 g(0.0333 mol) | Benzotrichloride 13.0 g(0.0666 mol) | FeO 0.2 g | 140°C. 3 hrs. | Benzoyl chloride 7.2 g(77.0 %) Isophthaloyl chloride 4.7 g(70.0 %) |
| 8 | Polyethylene-2,6-naphthalene dicarboxylate 8.6 g(0.0355 mol) | 1,3-Di(trichloromethyl)benzene 10.4 g(0.0333 mol) | FeCl$_3$ 0.05 g | 175°C. 4 hrs. | Isophthaloyl chloride 3.8 g(62.3 %) 2,6-Naphthoyl chloride 5.1 g(60.5 %) |
| 9 | Polyethylene isophthalate 6.4 g(0.0333 mol) | Benzotrichloride 13.0 g(0.0666 mol) | AlCl$_3$ 0.02 g | 140°C. 2 hrs. | Benzoyl chloride 7.2 g(77.0 %) Isophthaloyl chloride 5.1 g(75.0 %) |
| 10 | Polyethylene terephthalate 1.92 g(0.01 mol) | 1,4-Di(trichloromethyl)benzene 3.3 g(0.01 mol) | Al powder 0.1 g | 180°C. 7 hrs. | Terephthaloyl chloride 1.4 g(69.0 %) |
| 11 | Polyethylene terepthalate 2.87g(0.015 mol) | 1,3-Di(trichloromethyl)benzene 5.0 g(0.016 mol) | Al$_2$O$_3$ 0.2 g | 190°C. 25 hrs. | Terephthaloyl chloride 1.4 g (46.0 %) Isophthaloyl chloride 1.3 g(42.0 %) |
| 12 | Polyethylene terephthalate 6.4 g(0.0333 mol) | 1,4-Di(trichloromethyl)benzene 11.0 g(0.0350 mol) | Fe(OH)(CH$_3$CO$_2$)$_2$ 0.2 g | 185°C. 7 hrs. | Terephthaloyl chloride 9.8 g(72.5 %) |
| 13 | Polyethylene terephthalate 6.4 g(0.0333 mol) | 1,4-Di(trichloromethyl)benzene 11.0 g(0.0350 mol) | Fe(NO$_3$)$_3$ 9H$_2$O 0.2 g | 185°C. 7 hrs. | Terephthaloyl chloride 9.8 g(72.4 %) |
| 14 | Polyethylene terephthalate 6.4 g(0.0333 mol) | 1,4-Di(trichloromethyl)benzene 11.0 g(0.0350 mol) | FeSO$_4$·x H$_2$O 0.2 g | 185°C. 7 hrs. | Terephthaloyl chloride 9.5 g(70.0 %) |

Table 3

| Run No. | Trichloromethyl radicals/Ester radicals (molar ratio) | Yield of terephthaloyl chloride (%) |
| --- | --- | --- |
| 1 | 1.000 | 84.2 |
| 2 | 1.025 | 90.0 |
| 3 | 1.050 | 92.5 |
| 4 | 1.075 | 93.3 |
| 5 | 1.100 | 91.5 |
| 6 | 1.125 | 72.5 |

Controls

The cases where $MnCl_2 \cdot 4H_2O$, $PbCl_2$, $CrCl_3 \cdot xH_2O$, $BiCl_3$, $SbCl_3$ or $CuCl_2 \cdot 2H_2O$ is used as catalyst and the case where no catalyst is used were examined.

In each case, polyethylene terephthalate (PET) and 1,4-di(trichloromethyl)benzene were used so that the molar ratio of the trichloromethyl radicals to the ester radicals might be 1.05, and the reaction was carried out at 180° – 185°C. for 7 hours in the presence of 2 percent by weight, based on PET, of said catalyst.

In case $BiCl_3$ was used as catalyst, it was recognized that a very small amount of terephthaloyl chloride was formed (yield: a few per cent), but in the other cases terephthaloyl chloride did not form at all.

We claim:

1. A process of the preparation of aromatic acid chlorides characterized by reacting a polyester having an inherent viscosity higher than 0.2 when measured in orthochlorophenol at 30°C. comprising an aromatic dibasic acid selected from the group consisting of terephthalic acid, isophthalic acid, phthalic acid, diphenyl dicarboxylic acid, 2,6-naphthalene dicarboxylic acid and 2,7-naphthalene dicarboxylic acid as the main acid component with at least one kind of trichloromethylbenzene selected from the group consisting of mono(trichloromethyl)benzene, mono(trichloromethyl)benzene having a nuclear-substituted chlorine atom, 1,3-di-(trichloromethyl) benzene, 1,4-di(trichloromethyl) benzene, 1,3,5-tri(trichloromethyl)benzene and trichloromethylbenzene having a structure arrived at by substitution of trichloromethyl radicals for the carboxyl radicals of the aromatic dibasic acid component of said polyester, in the presence of at least one catalyst selected from the group consisting of iron, aluminum, their oxides, their sulphides and their salts at a temperature of 100° to 300°C. to produce an acid chloride of said aromatic dibasic acid and an aromatic acid chloride formed by conversion of all the trichloromethyl radicals in said trichloromethylbenzene to chlorocarbonyl radicals.

2. The process of claim 1 wherein said trichloromethylbenzene is meta- or para-di(trichloromethyl)benzene.

3. The process of claim 1 wherein the molar ratio of the trichloromethyl radicals of said trichloromethylbenzene to the ester radicals of said polyester (trichloromethyl radicals/ester radicals) is within a range of 0.9 to 1.2.

4. The process of claim 1 wherein the molar ratio of the trichloromethyl radicals of said trichloromethylbenzene to the ester radicals of said polyester is within a range of 1.0 to 1.1.

5. The process of claim 1 wherein the catalyst is selected from the group consisting of iron, its oxides and its sulphides.

6. The process of claim 1 wherein the catalyst is selected from iron salts.

7. The process of claim 1 wherein the catalyst is selected from iron chlorides.

8. The process of claim 1 wherein the amount of catalyst is 0.01 – 10 % by weight based on said polyester.

9. The process of claim 1 wherein the reaction temperature is 120° – 220°C.

* * * * *

UNITED STATES PATENT OFFICE
CERTIFICATE OF CORRECTION

Patent No. 3,835,186                    Dated September 10, 1974

Inventor(s) Kazutoshi FUNABASHI ET AL

It is certified that error appears in the above-identified patent and that said Letters Patent are hereby corrected as shown below:

In the Heading, correct the spelling of the assignee to read as follows:

-- Teijin Limited, Osaka, Japan --

Insert patentees Foreign Application Priority Data as follows:

-- Claims priority, application Japan, March 10, 1972,

No. 47-24593/72. --

Signed and sealed this 31st day of December 1974.

(SEAL)
Attest:

McCOY M. GIBSON JR.
Attesting Officer

C. MARSHALL DANN
Commissioner of Patents